United States Patent [19]

Sciacca et al.

[11] Patent Number: 5,617,504
[45] Date of Patent: Apr. 1, 1997

[54] COGENERATION SYSTEM AND CONTROL THEREFOR WITH AUXILIARY HEATING ELEMENTS AND THERMAL BARRIER

[76] Inventors: Thomas Sciacca, 31 Rolling La., Wayland, Mass. 01778; Neil Slavin, 201 Hayden Rd., Groton, Mass. 01450

[21] Appl. No.: 321,456

[22] Filed: Oct. 11, 1994

Related U.S. Application Data

[63] Continuation of Ser. No. 892,571, Jun. 3, 1992, abandoned.

[51] Int. Cl.⁶ .............................. B60L 1/02; F01K 15/00
[52] U.S. Cl. .............................. 392/307; 290/2; 237/12.1; 219/492
[58] Field of Search .............................. 392/307, 464; 290/2, 46; 237/12.1, 13; 62/323.1; 219/492, 486, 480

[56] References Cited

U.S. PATENT DOCUMENTS

| | | | |
|---|---|---|---|
| 1,489,501 | 4/1924 | Miner, Jr. | 237/12.1 |
| 1,768,975 | 7/1930 | Brown | 290/2 |
| 2,051,240 | 8/1936 | Berryman | 237/13 |
| 2,064,654 | 12/1936 | Gannon | 219/480 |
| 2,076,382 | 4/1937 | Minton | 290/2 |
| 2,096,967 | 10/1937 | Johnson | 237/13 |
| 3,809,914 | 5/1974 | Kilgore et al. | 290/38 |
| 4,150,300 | 4/1979 | Van Winkle | 290/2 |
| 4,880,993 | 11/1989 | Packer et al. | 290/2 |

FOREIGN PATENT DOCUMENTS

| | | | |
|---|---|---|---|
| 2334687 | 1/1974 | Germany | 290/46 |
| 60-207848 | 10/1985 | Japan | 392/464 |
| 5-157352 | 6/1993 | Japan | 392/464 |

*Primary Examiner*—John A. Jeffery
*Attorney, Agent, or Firm*—Cesari and McKenna, LLP

[57] ABSTRACT

A cogeneration system that is particularly suited to residential use comprises an internal combustion engine, preferably diesel, coupled to a generator, preferably of the induction type. The generator and the engine are thermally isolated from each other so that the engine can run hotter (and thus more efficiently) without adversely affecting the generator. A supplemental electric heater supplies additional heat when the thermal output of the engine is insufficient. A dual stage controller for the heater controls its operation for enhanced efficiency. A generator controller enables the generator to serve the additional function of starting the engine when heat is called for, thus obviating a separate starting motor and related equipment. The system provides a high operating efficiency.

10 Claims, 2 Drawing Sheets

COGENERATION SYSTEM AND CONTROL THEREFOR WITH AUXILIARY HEATING ELEMENTS AND THERMAL BARRIER

This application is a continuation of Ser. No. 07/892,571, filed June. 3, 1992, now abandoned.

BACKGROUND OF THE INVENTION

A. FIELD OF INVENTION

The invention relates to cogeneration systems, and particularly to residential cogeneration systems although it is not limited thereto.

B. PRIOR ART

Cogeneration systems are used to provide both heat and electrical power. Such systems offer potential savings to large consumers of electricity, and are used most commonly in a commercial setting. It has occasionally been proposed to use cogeneration systems in a residential environment, but numerous problems such as safety concerns, noise, maintenance issues, lower efficiency of smaller units and the like concerns have greatly limited the actual implementation of such systems.

OBJECTS OF THE INVENTION

A. Objects

Accordingly, it is an object of the invention to provide an improved cogeneration system.

Further, it is an object of the invention to provide an improved cogeneration system that is compact and efficient and is particularly suited for residential applications.

Yet a further object of the invention is to provide an improved controller for cogeneration systems.

B. BRIEF DESCRIPTION OF THE INVENTION

In accordance with the preferred embodiment of the present invention described herein, a cogeneration system comprises a prime mover in the form of a diesel engine coupled to an induction generator. A heat-transfer agent such as water is passed through a heat exchanger through which the engine exhaust gasses are removed, and is thereafter passed through the engine block to provide cooling therefor while at the same time receiving further heat therefrom. A supplemental electric heater is positioned to supply further heat to the water when necessary. The heated water is thereafter conducted to the space to be heated.

The induction generator generates electricity whenever the engine is operating. The electricity thereby generated is made available for operating the electrical systems of the facility in which it is located. During periods in which the engine is operating for a significant portion of the day (e.g., during colder weather), an excess of electricity is generated. This excess is fed back into the electric utility lines, and the utility then credits the facility with the appropriate amount of generation.

In accordance with the present invention, the engine and the generator are located in separate, thermally isolated compartments. This allows the engine compartment to run at a relatively high temperature (on the order of 160 degrees Fahrenheit) and greatly improves the heat transfer to the water and thus the efficiency of the system.

A controller for the system further enhances the efficiency of the system by allowing the use of a system of smaller generated thermal capacity than commonly provided, which is then run at higher duty cycle. Further, unlike many systems which use outdoor air temperature as the reference for setting operating points, the present system is referenced to the particular usage characteristics of the facility in which it is installed. Thus, it can provide the necessary heating at relatively high efficiency.

In particular, in the present invention, the usage of the supplemental heater is tightly controlled to ensure maximum economy while providing sufficient heat to maintain the desired level of comfort. This is accomplished by measuring the accumulated system operating time during a defined period and setting the operating characteristics of the system for the next day in accordance with the measured result. In the preferred embodiment, the defined period is from 7:00 PM to 11:00 PM. The percentage of time during which the engine operates during this period is determined, and the controller then sets the system to one of a specified number of operating "bands" for the next day's operation. For example, we utilize a 16-band operation for residential systems. If it is found that the engine operates for a total of two and one-half hours out of four during the 7–11 PM measuring period, the controller sets the system to operate in band 10 ( (2.5/4)*16=10) for the following day. Each band defines a distinct delay time in each cycle of engine operation before the supplemental heater is turned on. In general, the lower the band number, the longer the delay before turning on the supplemental heater.

Further in accordance with the present invention, the supplemental heater itself is divided into two sections, operable independently. The energization of the two sections is controlled in accordance with two different rules so as to further optimize the efficiency and economy of the present system. In the preferred embodiment described herein, the energization of the first ("locally generated power") section is performed in accordance with a linear characteristic, while the energization of the second ("purchased power") section is performed in accordance with a geometric characteristic. The supplemental heater is connected to receive power from the local generator as well as from the utility. The system is structured such that, for a large portion of the time, the thermal demands on the system will be satisfied by the engine alone, and neither heater section will be energized. As greater thermal demands are imposed on the system, the first heater will be energized and, if the demands continue, the second heater will also be energized. Initially, all the power for the heaters will come from the local generator. When the capacity of this unit is exhausted, the remaining power necessary to satisfy the thermal demands will be drawn from the utility. Provisions are made to manually override the settings when desired so that, for example, additional heat can be made available for above average heating or hot water needs.

Yet a further aspect of the present invention is a control circuit for the generator which allows its efficient operation as either a motor or as a generator. Thus, the engine of the present system can be started with the generator, without storage batteries, chargers, or separate starting motors. In particular, the generator comprises an induction generator having the usual main winding and a switchable auxiliary winding that enables its function as a motor as well. The auxiliary winding is switched into circuit in a first polarity to run the generator as a starting motor for the engine, and is thereafter switched into circuit with a second, reverse polarity to run the generator in its normal generator mode.

DETAILED DESCRIPTION OF THE INVENTION

The foregoing and other and further objects and features of the invention will be more readily understood from the following detailed description of the invention, when taken in conjunction with the accompanying drawings, in which.

Figure 1:
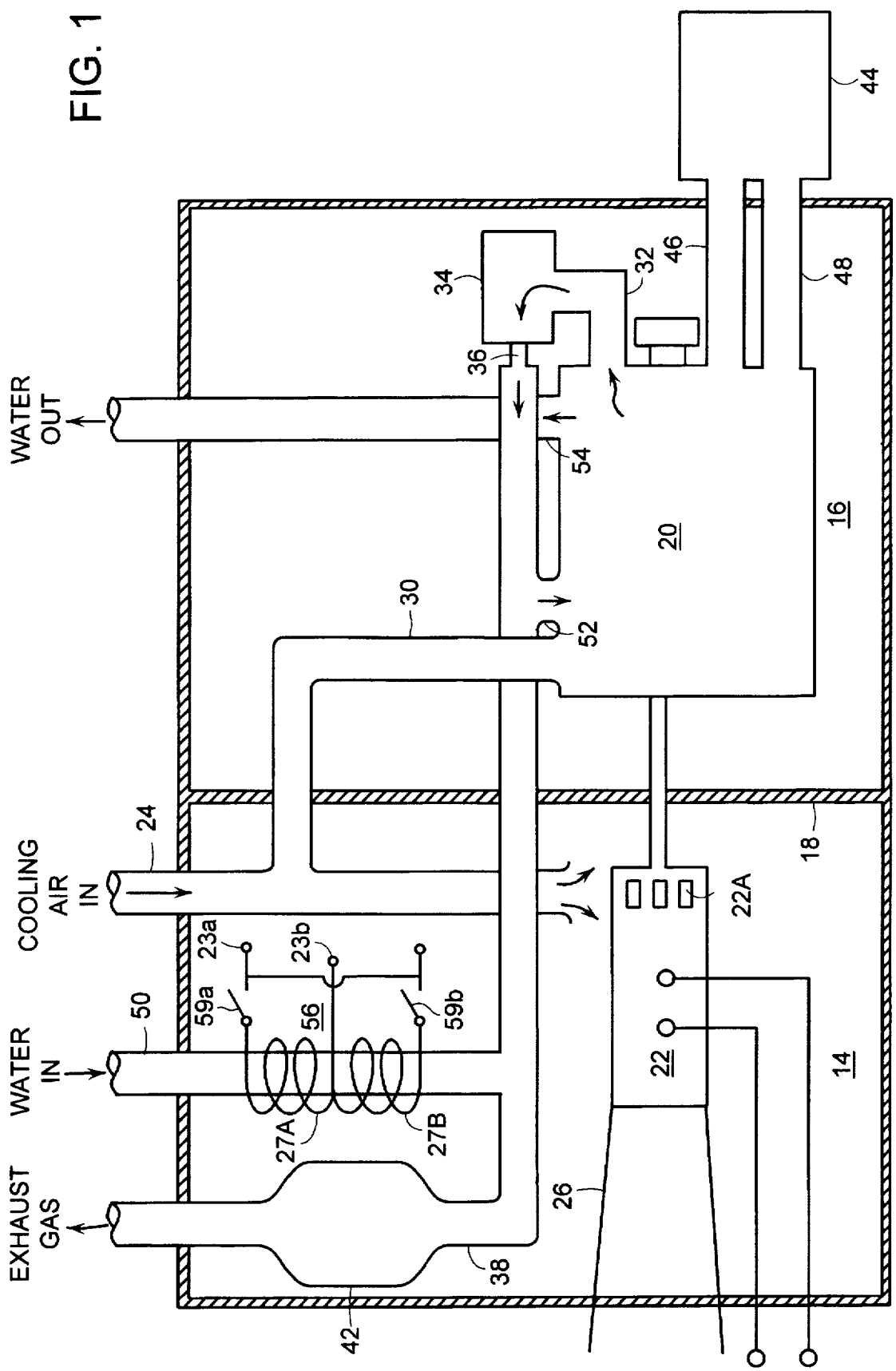
FIG. 1 is block and line sketch of a cogeneration system constructed in accordance with the present invention.

Turning now to FIG. 1, a cogeneration system 10 in accordance with the present invention comprises a housing 12 divided into thermally-separated compartments 14, 16, respectively, by a thermal barrier 18. An engine 20 is located in compartment 16, and a generator 22 is located in compartment 14. A conduit 24 supplies outside cooling air to generator 22. The air flows downwardly to cooling vents 22a in generator 22. After passing through the generator, it exits the system 10 by way of a plenum 26.

Air from inlet 24 is also fed to engine 20 via a conduit 30. Exhaust air from the engine 20 is discharged into a pipe 32, an expansion chamber 34, a pipe 36, and thence into a heat exchanger 38. Heat exchanger 38 is preferably a conventional multi-tube element in which the heating fluid is carried within a first set of tubes within the exchanger shell and the fluid to be heated is carried in countercurrent direction outside the tubes but within the shell. Such a construction is well known and thus will not be illustrated in detail. The exhaust gas is discharged from the heat exchanger into a muffler 40, and is then carried to the exterior of the installation for discharge into the atmosphere by means of pipe 42. An external oil reservoir 44 is connected to the engine via pipes 46 and 48.

Water to be heated is supplied to the system via a pipe 50 which connects to the heat exchanger 38 where heat is transferred to the water as it transits the exchanger. The heated water exits the heat exchanger via pipe 52 which carries it into the engine for further collection of heat. The heated water is discharged from the engine into a pipe 54 which carries it into the residential area to be heated. A supplemental heater in the form of a dual-section electric resistance heater 56 having first and second windings 57a and 57b, respectively, is connected via independently operable switches 59a and 59b, respectively, to the generator 22 as well as to the utility lines for energization by either or both. When energized, the heater 56 provides additional heat input to the water in pipe 50.

In accordance with the present invention, the engine 20 is a diesel engine, having a power rating on the order of 11 horsepower (and a thermal output of approximately 50,000 BTU) for a typical residential home in the northeastern sector of the United States, although the exact capacity will be selected in accordance with the size of the area to be heated, the specific needs of the inhabitants (e.g., a larger family may require more water for washing, etc.), and the area of the country. Such a capacity is considerably less than conventional residential heating wisdom teaches is necessary for ensuring adequate heat during periods of high thermal demand, such as continued cold weather or high demand for water for washing, etc. However, by using an engine of this size, we are able to operate it with a higher duty cycle than is common in residential heating systems, and thereby considerably improve heating efficiency. Correspondingly, the generator 22 preferably has a rating on the order of 5 kilowatts. This is generally sufficient to supply the entire electric energy requirements of a typical single-family residence during the heating season and, additionally, provide further capacity for supplemental heating when required.

External oil reservoir 44 has a substantially greater oil capacity than engine 20 and, because it is located external to the engine, has a significantly lower ambient temperature than that within the engine block. For example, for an 11 horsepower system, the engine 20 typically has an oil capacity of less than a gallon, while the external reservoir has a capacity in excess of ten gallons. By recirculating the oil through the external reservoir while the engine is on, the average oil temperature is considerably decreased and its life, and thus the life of the engine, is considerably prolonged, thereby facilitating the utilization of the cogeneration system in an environment (residential heating) where it is not normally used.

A further provision facilitating utilization of the present system in a residential environment is the use of a resilient muffler of the type commonly used in marine exhaust systems (e.g., in pleasure boats) for the muffler 40. Such a muffler is commonly made of a tough but flexible rubber or plastic material, and we have found that it provides excellent vibration isolation between the heating system and the external vent pipe 42. We do not believe that mufflers of this type have heretofore been applied to cogeneration systems, particularly residential cogeneration systems. Similarly, pipe 42 is preferably of plastic. This again is uncommon for exhaust discharge systems, particularly cogeneration systems, but has proven to be of significant benefit in prolonging system life by resisting the corrosive discharges characteristic of diesel systems.

Thermal barrier 18 provides heat insulation between the compartments 14 and 16. This allows compartment 16 to remain at a relatively high temperature (e.g., approximately 160 degrees Fahrenheit) during operation of the engine 20, while allowing compartment 14 to operate at a much lower temperature (e.g., approximately 100 degrees Fahrenheit). The higher temperature in compartment 16 enhances the efficiency of heat capture and transfer to the residential heating water. The lower temperature in compartment 14 enhances the life of generator 22 while simultaneously decreasing the amount of cooling air needed from the outside to maintain the lower temperature and thus further increasing the efficiency of the system. Indeed, as a result of the system design as described herein, we have determined that an operating efficiency of approximately 93% has been achieved.

The system of the present invention operates in response to a heat demand element such as a thermostat. When the thermostat calls for additional heat, engine 20 is started and the heat from its operation is transferred to the circulating water as described above. At the same time, generator 22, which is connected to engine 20, is rotated by the engine to thereby generate electricity. The electricity so generated is connected to the household main supply line, which in turn is connected to the utility line through an electric metering system which measures household electric use for billing purposes. To the extent that the household demand for electricity (including the demand for electricity in the supplemental heater 56) is equal to or less than the output of generator 22, the demand is met by the generator output and the excess is fed back to the utility to obtain an electric power generation credit. Conversely, to the extent that the demand is greater than the output of generator 22, the demand is met to the extent of this output and the deficiency is made up by drawing power from the utility.

In accordance with the present invention, generator 22 is an induction generator. Such a generator has the desirable characteristic that it inherently adjusts to the utility line voltage and frequency when it is connected to it. This considerably simplifies the interconnection to the utility line. Further, having much simpler construction, it has an inherently greater life than generators of the synchronous type.

Figure 2:
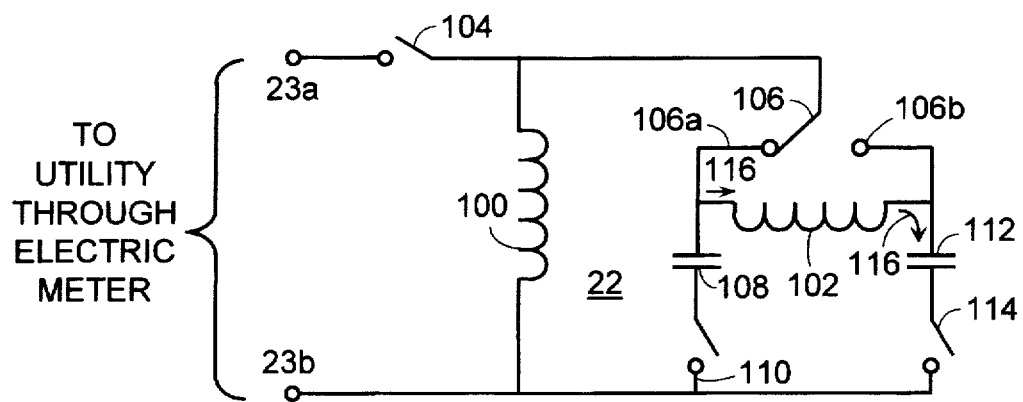
FIG. 2 is a circuit diagram of the generator/motor circuit of the present invention.

In the present invention, generator 22, in addition to generating electric power, serves as a starting motor for engine 20. FIG. 2 shows how this is accomplished. Generator 22 has a main winding 100 and an auxiliary winding 102 as is known in the art. The main winding is connected in parallel across terminals 23a and 23b via a main switch 104 in the usual manner. However, in accordance with the present invention, the auxiliary winding 102 is connected across main winding 100 by means of single pole, two position switch 106. The opposite ends of the auxiliary winding 102 are connected to terminal 23b by a first capacitor 108 and switch 110, and by a second capacitor 112 and switch 114, respectively.

When heat is demanded from the system, the main controller (described in more detail below) responds by closing switches 104 and 114 of generator 22. This connects the generator to the main terminals 23a and 23b, and current is drawn from the utility system. With switch 106 positioned as shown in FIG. 2, this current flows through winding 102 from left to right as shown by arrows 116, and thence downwardly through capacitor 112 and switch 114. Generator 22 then operates as a motor, and turns the shaft of engine 20 to start it. When the shaft reaches a defined speed, switch 114 is opened, then the pole of switch 106 is switched to terminal 106b, and switch 110 is also closed. The current through the auxiliary winding then flows in the reverse direction, from right to left in FIG. 2, and the generator 22 then begins operation in generator mode.

It will be seen from FIG. 2 that connection of the generator 22 to the electric utility is accomplished through a single switch. This greatly simplifies the interconnect, lowers its cost, and helps to make the present system economically feasible for residential use. Further, the generator control circuit of the present invention significantly contributes to the economic construction of the system, as well as its reliability and maintainability, by eliminating a separate starting motor and related equipment.

Figure 3:
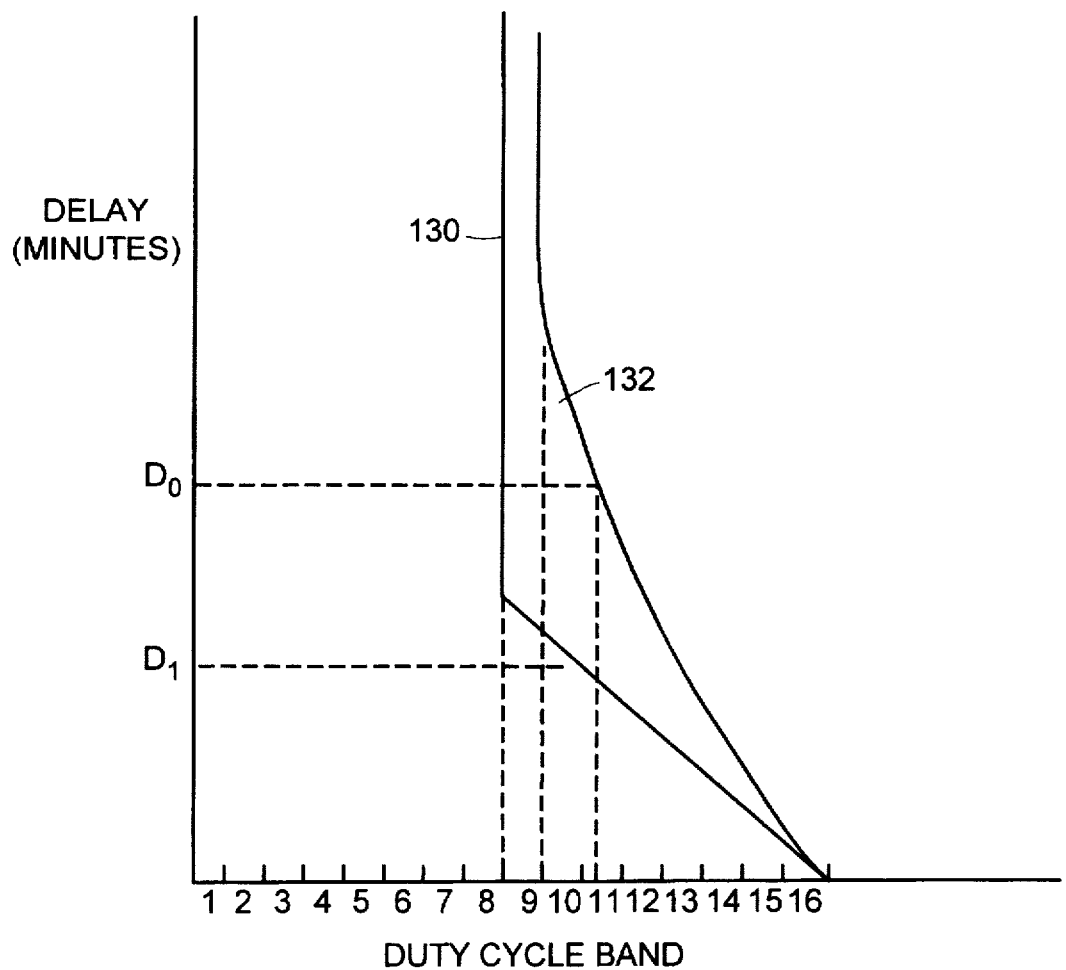
FIG. 3 is a graph showing the control paradigm for the supplemental heaters in accordance with the present invention.

Turning now to FIG. 3, a graph showing the relationship between the operation of the supplemental heating element and the duty cycle band of the system is set forth. The vertical axis shows the delay (in minutes) between the time that a call is generated by the system's heat demand element (e.g., the thermostat) and the duty cycle band that characterizes the state of the system at a given time; the horizontal axis indicates the various bands. For purposes of illustration, the system is shown as divided into 16 bands, numbered =b 0–15on FIG. 3, although it will be understood that a greater of lesser number of bands may be used. Each band corresponds to the fractional amount of time that the system has operated during a selected time interval, e.g., during the time period from 7 PM to 11 PM of the preceeding day. A first curve 130 shows the relationship for the first heater element, coil 57a, while curve 132 shows the relationship for the second supplemental heater element, coil 57b.

As long as the duty cycle is less than a certain fractional amount, neither heater is energized. For example, as shown in FIG. 3, as long as the system duty cycle for the time in question is less than 8/16, the first heater element 130 is not energized. Similarly, as long as the system is in a state in which the duty cycle is less than 9/16, the second heater is not energized. If, now, the system is in a state corresponding to a duty cycle higher than that corresponding to the initial delay interval, e.g., state 11 (corresponding to a duty cycle of 11/16, i.e., approximately 70%), the first and second heaters are energized only after a delay time of D'$_1$ and D'$_2$, respectively.

In accordance with a further aspect of the invention, the rate of decrease of the energization delay time of the heaters is established in accordance with two different paradigms, the first being essentially a linear decrease, and the second being essentially a geometric decrease, as shown in FIG. 3. We have found that this establishes a desirable balance between the need for heat and the desire to supply this need as much as possible from the thermally generated heat of the engine, as opposed to heat generated via the supplemental heater.

As a specific example of the foregoing, the following has been found to be a useful control paradigm for the heaters:

| System State No. | Heater #1 | Heater #2 |
|---|---|---|
| 8 | 60 | 255 |
| 9 | 50 | 255 |
| 10 | 40 | 240 |
| 11 | 30 | 180 |
| 12 | 20 | 120 |
| 13 | 15 | 60 |
| 14 | 10 | 30 |
| 15 | 5 | 15 |
| 16 | 5 | 10 |

Here, the numbers in the table for each of the heater elements indicate the delay in minutes before the corresponding heater element is turned on.

Briefly summarizing the operation of the heater 56, when the heat demand element (e.g., thermostat) call for heat, the system attempts to supply the heat first from the thermal output of the engine 20. As long as the duty cycle state of the system is sufficiently low, the heater 56 will not be utilized, since the delay in energization of the heater elements will exceed the time required for the thermal output of the engine to satisfy the heat demand. As the duty cycle state increases, the time required for the engine to generate the requisite thermal output increases correspondingly, and at some point will exceed the energization delay time of one or both of the heater elements. One or both of these elements will then be energized in order to generate supplemental heat for the heating medium (.e.g., water, in the case of a forced hot water system) for the residence. The electrical energy for these heaters is supplied from the generator 22 to the extent that the demands on the generator from other household systems (e.g., washers, dryers, electric stoves, lights, etc.) leaves an excess. To the extent that there is a deficiency in the required power, however, it is supplied from the electric utility. From data obtained in one test installation, we have determined that purchase of electric power from the electric utility should be necessary for only a relatively few hours per year (generally during the coldest months), and have found that power in fact will be supplied to the electric utility by the system for a substantial number of hours each year, thus earning power usage credits from the utility.

CONCLUSION

From the foregoing it will be seen that we have provided an improved cogeneration system. The system is particularly suited to residential applications, and is highly efficient. A unique controller enables use of a prime heat generator of comparatively smaller capacity than commonly believed feasible, while providing sufficient capability to meet even extreme needs. Supplemental heating means driven first from locally generated electricity, and then from purchased electricity, ensures that the system provides adequate heat at all times but in an economical manner.

It will be understood that the foregoing has described an illustrative embodiment only, and that various changes may be made therein without departing from either the spirit or the scope of the invention, the invention being defined with particularity in the claims appended hereto.

We claim:

1. A cogeneration system suitable for residential applications, comprising:
    A. an engine for providing both heat and motive power,
    B. a generator coupled to said engine for providing electric power,
    C. electric heating means for providing additional heat, comprising a first electrical heat source and a second electrical heat source, and
    D. controller means for controlling the energization of said first and second electrical heat sources during a given period in accordance with measured operating characteristics of said system during a defined prior time interval which is representative of overall system energy demand for a next operating time period, for applying the measured operating characteristic to control energization of the electric heating means for the next operating time period by computing a duty cycle band value indicative of the measured operating characteristic and computing a first delay value and a second delay value based upon said duty cycle band, wherein each of said delay values is indicative of a time delay before said first and second electrical heat sources, respectively, will be energized.

2. A cogeneration system according to claim 1 in which said electric heating means is connected for energization by said generator to the extent that said generator provides electrical output in excess of the electrical load imposed by said electric heating means.

3. A cogeneration system according to claim 2 in which said electric heating means is connected for energization by an electric utility to the extent that said generator provides electrical output less than the electrical load imposed by said electric heating means.

4. A cogeneration system according to claim 1 in which said first and second heating sources are energized by said controller in accordance with separate control cycles.

5. A cogeneration system as in claim 1 wherein said measured operating characteristics consist of a measurement of the accumulated system operating time during the selected prior time interval which occurred during the previous day.

6. The cogeneration system of claim 1 wherein the relationship between said duty cycle band and said first delay value is characterized by a generally linear paradigm, while the relationship between said duty cycle band and said second delay value is characterized by a generally geometric paradigm.

7. A cogeneration system suitable for residential applications, comprising:
    A. an engine for providing both heat and motive power,
    B. a generator coupled to said engine for providing electric power,
    C. electric heating means for providing additional heat, said electric heating means comprising first and second heating means independently actuable, and
    D. a controller controlling the energization of said electric heating means during a given period in accordance with measured operating characteristics of said system during a selected prior time interval, in which said controller energizes said electric heating means as a function of the duty cycle of said system during said time interval, in which said first heating means is energized by said controller in accordance with a generally linear paradigm when said system is in a duty cycle state in excess of a first state, and said second heating means is energized in accordance with a generally geometric paradigm when said system is in a duty cycle state corresponding to a second state.

8. In a cogeneration system having an engine for generating heat and an induction generator driven from said engine, the improvement comprising means for operating said generator as a motor, comprising
    A. an auxiliary winding in said generator,
    B. means for switching alternating current through said auxiliary winding in a first phase to operate said generator as a motor, and means for switching current through said auxiliary winding in a second phase to operate said generator as a generator.

9. A supplemental heating system in which a controller energizes an electric heating means as a function of the duty cycle of a primary heating system during a prior time interval, and said electric heating means comprises first and second heating means independently actuable, and said first and second heating means are energized by said controller in accordance with separate control cycles,
    in which said first heating means is energized by said controller in accordance with a generally linear paradigm when said system is in a duty cycle state in excess of a first state, and said second heating means is energized in accordance with a generally geometric paradigm when said system is in a duty cycle state corresponding to a second state.

10. A cogeneration system suitable for residential applications, comprising:
    an engine for providing heat and motive power;
    a generator coupled to said engine for providing electric power;
    an acoustical noise attenuating housing within which said engine and generator reside, wherein said housing attenuates acoustic noise originating within said housing to reduce the level of noise external to said housing; and
    a thermal barrier located within said housing and disposed between said engine and said generator to establish a thermal barrier between said engine and said generator.

* * * * *

UNITED STATES PATENT AND TRADEMARK OFFICE
CERTIFICATE OF CORRECTION

PATENT NO. : 5,617,504

DATED : April 1, 1997

INVENTOR(S) : Thomas Sciacca and Neil Slavin

It is certified that error appears in the above-identified patent and that said Letters Patent is hereby corrected as shown below:

Claim 8, line 8, after "switching" insert —alternating—.

Signed and Sealed this

Twenty-second Day of July, 1997

Attest:

BRUCE LEHMAN

Attesting Officer

Commissioner of Patents and Trademarks